US 8,288,905 B2

(12) United States Patent
Qin et al.

(10) Patent No.: US 8,288,905 B2
(45) Date of Patent: Oct. 16, 2012

(54) BRUSH MOTOR HAVING CUP SHAPED END CAP

(75) Inventors: Rui Feng Qin, Hong Kong (CN); Fa Yun Qi, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 267 days.

(21) Appl. No.: 12/626,032

(22) Filed: Nov. 25, 2009

(65) Prior Publication Data
US 2010/0127587 A1 May 27, 2010

(30) Foreign Application Priority Data
Nov. 26, 2008 (CN) .......................... 2008 1 0217669

(51) Int. Cl.
H02K 5/24 (2006.01)
H02K 5/14 (2006.01)
H02K 5/15 (2006.01)

(52) U.S. Cl. ......... 310/89; 310/67 R; 310/239; 310/248; 310/244; 310/249; 310/52; 310/400

(58) Field of Classification Search ................ 310/67 R, 310/89, 400–417, 239–247; H02K 5/14, H02K 5/15, 5/24
See application file for complete search history.

(56) References Cited

U.S. PATENT DOCUMENTS

| | | | | |
|---|---|---|---|---|
| 4,259,603 A | * | 3/1981 | Uchiyama et al. | 310/68 B |
| 5,049,770 A | * | 9/1991 | Gaeth et al. | 310/89 |
| 5,977,665 A | * | 11/1999 | Hartmann et al. | 310/51 |
| 6,087,746 A | * | 7/2000 | Couvert et al. | 310/60 R |
| 6,232,687 B1 | * | 5/2001 | Hollenbeck et al. | 310/88 |
| 6,236,137 B1 | * | 5/2001 | Tanaka et al. | 310/233 |
| 6,617,748 B2 | * | 9/2003 | Dunn | 310/268 |
| 6,859,992 B2 | * | 3/2005 | Gubbels | 29/596 |
| 7,180,215 B2 | * | 2/2007 | Archer et al. | 310/89 |
| 7,365,459 B2 | * | 4/2008 | Bogdan et al. | 310/71 |
| 2008/0203830 A1 | * | 8/2008 | Simofi-Ilyes et al. | 310/43 |

FOREIGN PATENT DOCUMENTS

| JP | 11055894 | * | 2/1999 |
|---|---|---|---|
| JP | 2005304213 | * | 10/2005 |

OTHER PUBLICATIONS

Machine translation of Kato et al. JP2005304213, Oct. 2005.*
Machine translation of Fujiwara et al. JP11055894, Feb. 1999.*

* cited by examiner

*Primary Examiner* — Quyen Leung
*Assistant Examiner* — Terrance Kenerly
(74) *Attorney, Agent, or Firm* — Muncy, Geissler, Olds & Lowe, PLLC

(57) ABSTRACT

A motor for HVAC applications, has a stator; a motor housing forming a part of the stator; an end cap fixed to the motor housing, and a rotor rotatably mounted confronting the stator. The end cap has an opening formed by a ring-shaped collar, the collar being at least partly disposed inside the motor housing. A plurality of projections on an outer circumferential surface of the collar are received in a plurality of receiving cutouts in the motor housing. Two fingers formed at the opening of each receiving cutout are deformed to lock the received projection inside the respective receiving cutout. At least three of the projections being pressed against the axially inner end of the respective receiving cutout.

18 Claims, 5 Drawing Sheets

BRUSH MOTOR HAVING CUP SHAPED END CAP

CROSS REFERENCE TO RELATED APPLICATIONS

This non-provisional patent application claims priority under 35 U.S.C. §119(a) from Patent Application No. 200810217669.0 filed in The People's Republic of China on Nov. 26, 2008.

FIELD OF THE INVENTION

This invention relates to a motor, and in particular, to a motor for heating, ventilation and air-conditioning (HVAC) applications.

BACKGROUND OF THE INVENTION

The noise from an electric motor comprises mechanical noise and electromagnetic noise. Factors resulting in mechanical noise include the way the motor end cap is assembled to the motor housing, the sliding contact between brushes and commutator, rotor coaxiality etc. Factors resulting in electromagnetic noise include stator poles, rotor core, rotor winding slots, etc.

One existing motor in HVAC applications is a DC motor having two stator poles and twelve rotor winding slots. The motor comprises two diametrically opposite brushes. Harmonic noise is emitted when the motor is running, such as $12^{th}$ harmonic, $24^{th}$ harmonic, $36^{th}$ harmonic, $48^{th}$ harmonic, etc. This harmonic noise is felt to be unpleasant by some people, especially with long term exposure as occurs in HVAC applications.

Therefore, there is a desire for a lower noise motor in HVAC application. There is an additional desire for a motor with low noise and an improved electromagnetic compatibility (EMC).

SUMMARY OF THE INVENTION

Accordingly, in one aspect thereof, the present invention provides a motor for HVAC applications, comprising: a stator; a motor housing forming a part of the stator; an end cap fixed to the motor housing, and a rotor rotatably mounted confronting the stator, wherein the end cap has an opening formed by a ring-shaped collar, the collar being at least partly disposed inside the motor housing, a plurality of projections being formed on an outer circumferential surface of the collar, a plurality of receiving cutouts being formed in the motor housing to receive the projections, two fingers being formed at the opening of each receiving cutout and deformed to lock the received projection inside the respective receiving cutout, at least three of the projections being pressed against the axially inner end of the respective receiving cutout.

Preferably, the projections being unevenly spaced about the collar.

Preferably, the number of projections is five and only three of the five projections are axially pressed against the axially inner end of the corresponding receiving cutouts.

Preferably, a plurality of ribs are formed on an outer circumferential surface of the collar, each of the ribs being axially aligned with a corresponding one of the projections and extending axially from the projection towards the opening formed by the collar, the outer diameter of the collar at portions corresponding to the ribs being slightly larger than an inner diameter of the motor housing.

Preferably, the stator comprises at least one permanent magnet fixed to an inner surface of the motor housing and forming four magnet poles; the rotor comprises a shaft, a rotor core fixed on the shaft and a commutator fixed on the shaft adjacent the rotor core; the commutator comprising an even number of segments for sliding contact with two brushes which are support by the end cap, each of the segments being electrically connected to a diametrically opposite segment by an electric bridge, the angle between the two brushes being between 80° to 100°.

Preferably, the motor comprises an air channel, the air channel having an air inlet formed in the end cap, gaps between the stator and the rotor, and air outlets formed in the end wall of the motor.

Preferably, the air inlet is located between the two brushes and is divided into a first inlet and a second inlet, the first inlet having a larger size than that of the second inlet.

Preferably, the end cap further comprises a capacitor, two chokes and two terminals for connecting to a power source, each of the chokes being connected in series with one of the brushes and one of the terminals, the capacitor being connected between the terminals.

Preferably, the terminals are assembled into a motor socket, the motor socket being connected to the end cap by a tongue and groove connection.

Preferably, the rotor core comprises fourteen winding slots, the winding slots being inclined with respect to the rotating axis of the rotor.

Preferably, the motor has a preferred direction of rotation and the radially outer end of each brush is offset from the radial direction in a direction opposite the preferred rotating direction of the motor.

Preferably, the end wall is elliptically convex and a bearing holder is formed at a center portion of the end wall.

An advantage of the present invention is that the motor has a lower noise. In an embodiment of the present invention, lower mechanical noise is achieved by forming ribs and projections onto the end cap and using a reduced number of brushes. Furthermore, compared to existing two stator poles motor, a four stator poles motor will have a higher excitation frequency and a lower harmonic noise.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

In the present specification and claims, "end wall" refers to the closed end of the motor housing adjacent the load, while "end cap" refers to the cover or cap which closes the input end of the motor housing.

Figure 1:
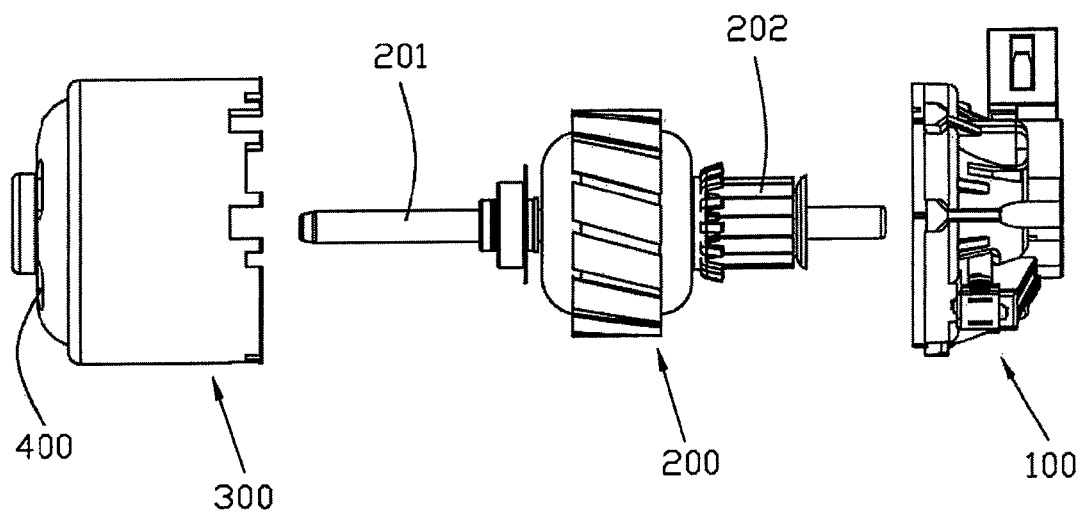
FIG. 1 is a exploded view of a motor in accordance with the preferred embodiment of the present invention.

FIG. 1 shows a motor having four stator poles and fourteen rotor winding slots in accordance with the present invention. The motor has a rotor 200 and a stator.

The motor has a motor housing 300 having one open end and one end closed by an end wall 400. An end cap 100 closes the open end of the motor housing. Magnet poles are deposited on inner surface of the motor housing, forming four magnetic poles. The four poles can be formed by four magnets 402 as shown, or two magnets or a single ring magnet. Compared to existing two pole motors, the four pole motor of the present invention has a higher vibration frequency, and thus having smaller vibration amplitude and a lower noise. Preferably, the winding slots are inclined or skewed with respect to the rotor axis of rotation.

The rotor 200 comprises a shaft 201, a rotor core fixed to the shaft 201, a commutator 202 fixed to the shaft 201 adjacent to the rotor core. The commutator 202 has an even number of segments, each of the segments being shorted or electrically connected to a diametrically opposite segment by an electric bridge. The electric bridges are preferably disposed outside the commutator body, and in particular, between the commutator and the rotor core. Alternatively the electric bridges can be disposed inside the body of the commutator. The number of the brushes is reduced due to the electric bridges. In this embodiment, only two brushes are required, and the noise caused by the sliding contact between brushes and commutator segments is reduced. Furthermore, there is more available space inside the end cap because only two brushes rather than four brushes are needed.

Figure 2:
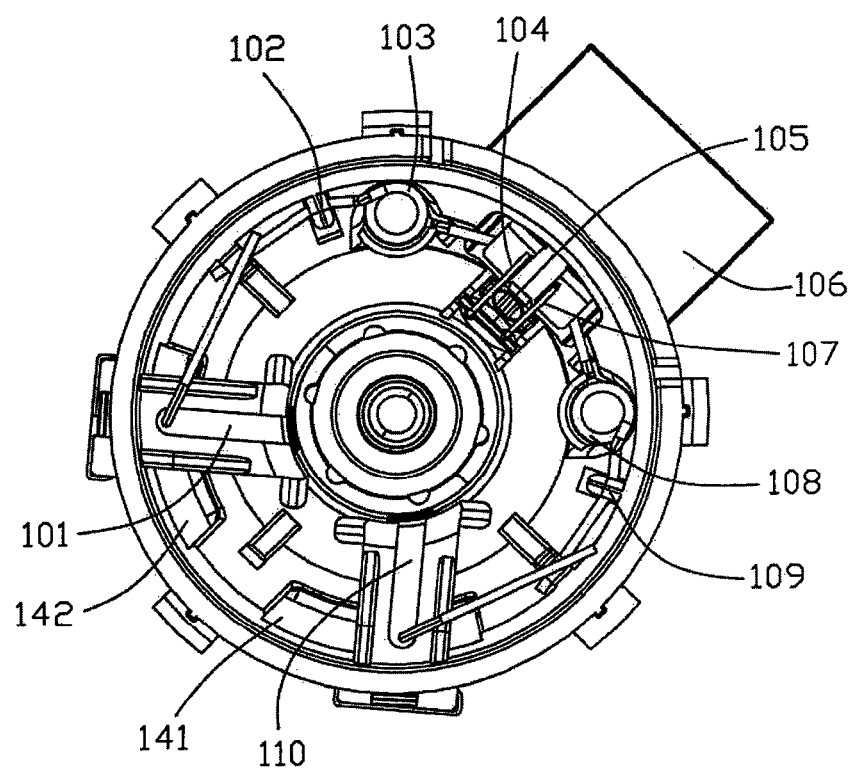
FIG. 2 is a plan view from below of a end cap of the motor of FIG. 1.

FIG. 2 is a plan view of the end cap 100. The two brushes 101 and 110 are assembled inside the end cap to make contact with the commutator segments. The end cap 100 further comprises two chokes 103 and 108, wherein choke 103 is connected in series between brush 101 and a motor terminal 104 of a motor socket 106, and choke 108 is connected in series between the other brush 110 and the other terminal 107 of the motor socket 106. The motor socket 106 is used to electrically connect with a power source to supply current into the motor. Anchors 102 and 109 are formed on the inner surface of the end cap to support or fix leads of the chokes 103 and 108 respectively. The chokes 103 and 108 function as filters to improve the motor's electromagnetic compatibility (EMC). Furthermore, the terminals 103 and 108 of the motor socket are shorted by a capacitor 105, to improve the EMC in a further step. Preferably, leads of the capacitor 105 can be soldered directly to the terminals of the motor socket 106.

Figure 3:
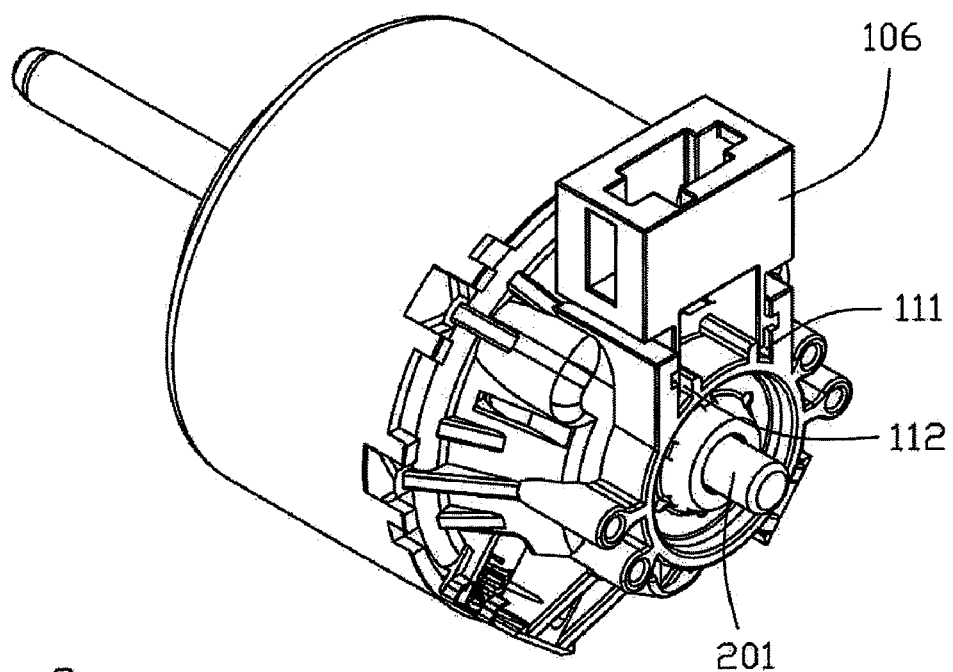
FIG. 3 is a view of the motor, showing the end cap and motor housing.

FIG. 3 is a perspective view of the motor. In the embodiment, socket 106 is press-fitted onto the end cap 100. More particularly, two axial grooves 111 and 112 are formed in the end cap which coact with projections on the socket to form a tongue in groove type connection. The two projections or tongues are axially pressed into the two grooves 111 and 112. The connection may be a press fit but preferably a detect is formed to lock the socket to the end cap. Alternatively, to make the engagement more stable, glue can be filled into the grooves 111 and 112. Since the motor socket 106 is a separate part and can be press-fitted onto the end cap 100, a suitable motor socket is selected from any available motor socket shapes or form to assemble to the end cap 100 during manufacturing process, to meet specific requirements of various power plugs according to customer requirements. After the motor socket 106 has been assembled to the end cap 100, the chokes and capacitor are connected to the terminals of the motor socket 106.

Figure 4:
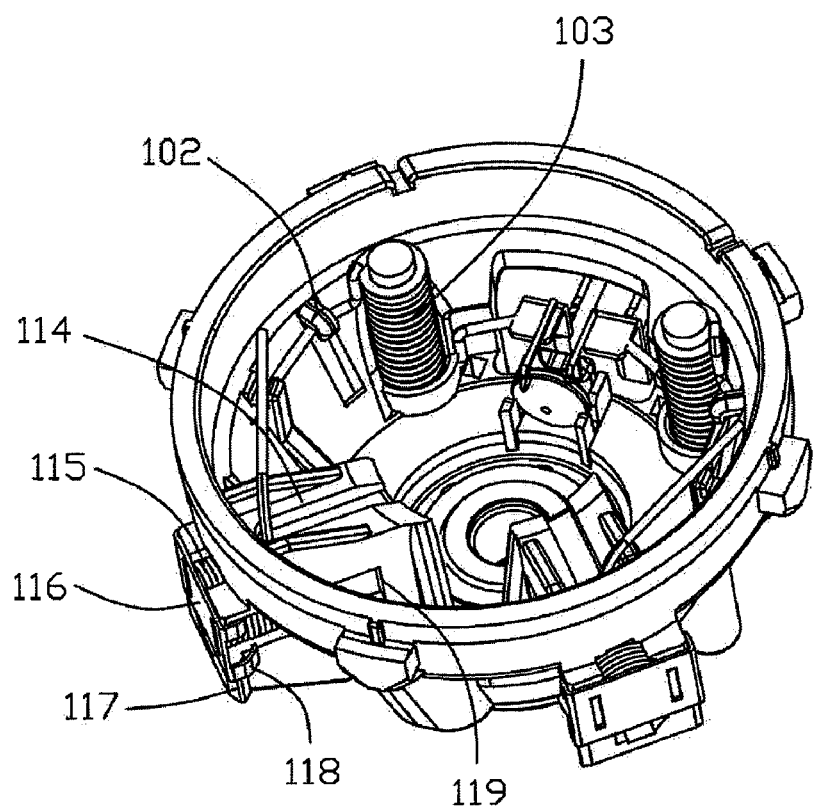
FIG. 4 is an enlarged inside view of the end cap.
Figure 5:
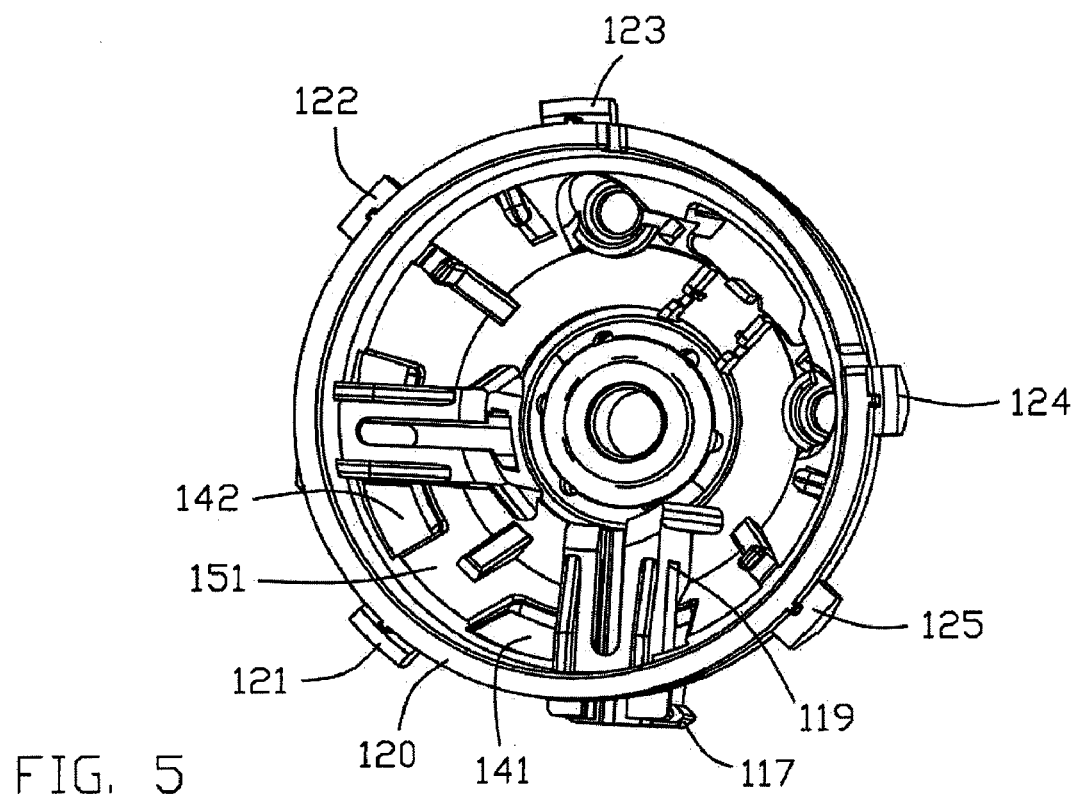
FIG. 5 shows the inner structure of the end cap with the components removed.

FIG. 4 shows an inside view of the end cap 100. The end cap 100 comprises two brush holders 114 to support the brushes. Each brush holder 114 comprises a chamber that is used to accommodate a brush and has an inner and outer openings, a chamber cover 116 installed over the outer opening, and a spiral spring 115 inside the chamber between the chamber cover 116 and the brush to urge the brush through the inner opening and into contact with the commutator. Referring to FIG. 4 and FIG. 5, two flanges 117 are formed at two opposite edges of the outer opening of the chamber, and fingers 118 are formed at two opposite edges of the chamber cover 116 to engage the flanges 117 to fasten the chamber cover to the chamber. A bump may be formed at one end of the flange 117 to prevent the chamber cover 116 sliding off. With this configuration, it is easy to assembly the brush, the spring 115 and the chamber cover 116.

Each brush is block shape extending substantially radially to make sliding contact with the commutator inside the end cap, having a rectangular axial cross section. The axial height of the brush is larger than the circumferential width of the brush. The brush is accommodated inside the chamber of the brush holder 114, and is supported by an axial upper wall and an axial lower wall of the chamber. The diameter of the spiral spring 115 is larger than the circumferential width of the brush, and is larger than the circumferential distance between two opposite side walls of the chamber. Radially extending grooves are formed in the two side walls to accommodate the spiral spring 115. At least one of the two radially extending grooves terminates near the inner opening of the chamber, to prevent the spring 115 extending out of the chamber and contacting the commutator when the brush wears out. In other words, stopper 119 is formed at the inner end of the radially extending groove to prevent the spring contacting the commutator.

Figure 6:
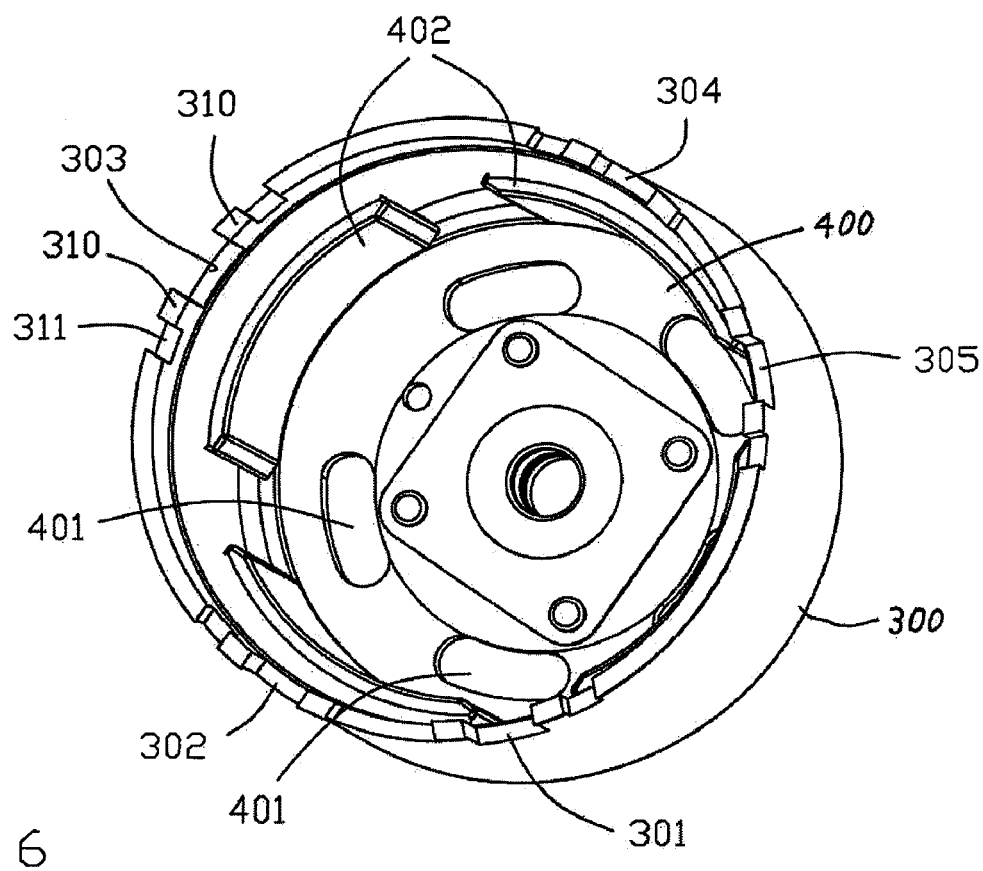
FIG. 6 is a view showing the inner structure of the motor housing.

FIG. 5 shows the end cap 100 with the components removed to reveal the inner structure of the end cap. FIG. 6 shows the inner structure of the motor housing 300 and its end wall 400. The two brushes are circumferentially spaced from each other by approximately 80° to 100°, which is different from conventional configuration where the two brushes are diametrically opposite. The motor of the present embodiment has a lower noise and a reduced spark due to the improved brush configuration. Furthermore, air inlet of a cooling channel such as inlet 141 and 142 are formed in the end cap 100 at the position between the two brush holders. Air flow entering the cooling channel will cool the brushes firstly and then cool any other components such as commutator segments. Compared with conventional motors whose brushes are spaced 180° and whose commutator is cooled prior to the brushes, air flow of present invention will have a better cooling effect for brushes. Therefore, the brushes will have a lower temperature and have a longer working life. Air inlet of the cooling channel is divided into inlet 141 and inlet 142 by a baffle plate 151. Inlet 141 and inlet 142 are arrayed along rotor's rotational direction, and inlet 141 has a larger size than that of inlet 142. When the rotor is rotating, a part of air flow that comes in through inlet 141 will be mixed into the air flow that comes in through inlet 142 due to the rotation of the rotor, therefore, the two brushes will be cooled by approximately equal amount of air flow respectively and have a reduced temperature difference. Returning to FIG. 6, air outlets such as air outlets 401, are formed in the end wall 400. The cooling channel is formed by inlets 141, gaps between stator and rotor 300, optional gaps inside the motor housing and rotor 300, and the outlets 401.

An opening is formed by a ring-shaped collar 120 which is used to assemble the end cap to the motor housing. Outer diameter of the collar 120 is slightly smaller than inner diameter of the motor housing so that the collar 120 can be fitted inside the motor housing. Five projections 121-125 are formed on the outer circumferential surface of the collar 120. Preferably, the five projections are unevenly spaced along circumferential direction of the collar 120. The motor housing has five receiving cutouts 301-305, each of which receives a corresponding one of the five projections 121-125. Two fingers 310 are formed at the opening of each of the receiving cutouts. The two fingers 310 can be bent or deformed towards to each other to lock the received projection inside the receiving cutout (see FIG. 8 although the fingers are shown before being bent). Preferably, each of the fingers is formed between a receiving cutout and an adjacent auxiliary cutout 311 that will not receive any of the projections 121-125. Three of the five projections 121-125 are pressed against the axial bottom of three of the five cutouts 301-305 respectively, while the other two projections are not pressed against the axial bottom of two corresponding receiving cutouts. Preferably, the bottoms of the three receiving cutouts are in a plane which is a radial plane, perpendicular to the rotating axis of the rotor. Referring to FIG. 6, in this embodiment, the motor housing 300 and the end wall 400 are made as a single piece, and the end wall is elliptically convex. For example, the single piece is made by deep drawing a sheet metal blank. Preferably, the inner surface of the motor housing, particularly the portion that receives the collar 120 of the end cap, are processed with fine turning to make sure the inner surface matches the motor axis.

Figure 7:
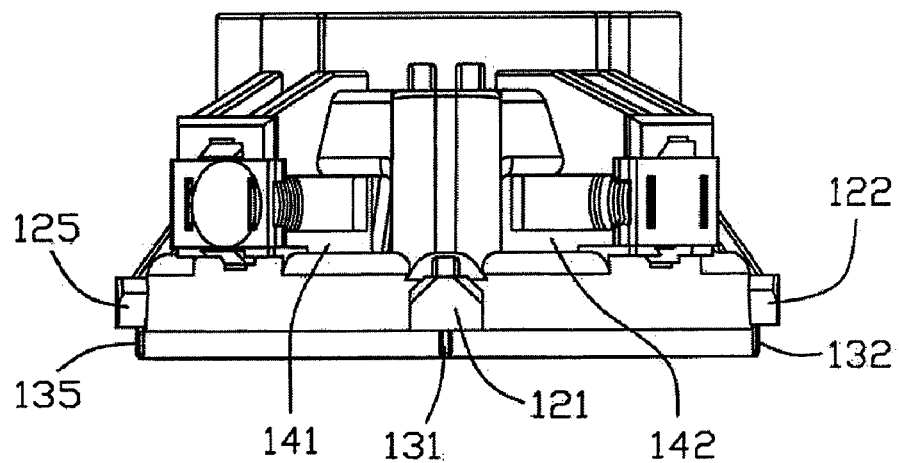
FIG. 7 is a side view of the end cap.

FIG. 7 is a side view of the end cap. Five axial ribs 131-135 are formed on the outer circumferential surface of the collar 120. Each of the five ribs are axially aligned with a corresponding one of the five projections 121-125. For example, rib 131 is axially aligned with a projection 121, and extends from the projection 121 towards the opening or free end of the collar 120. Both circumferential width and radial thickness of the rib are smaller than that of the projection. The outer diameter of the collar 120, at portions corresponding to the ribs, is slightly larger than the inner diameter of motor housing, so that the collar 120 can be tightly pressed inside the motor housing. Preferably, the radial thickness of the ribs 131-135 decreases gradually from the projections 121-125 to the open end of the collar 120, so that the end cap is easily inserted into the motor housing initially and then tightly engages with the motor housing. The ribs 131-135 mainly play a role of radial positioning and fixation. The ribs 131-135 also functions as a vibration damper between the motor housing and the end cap.

Figure 8:
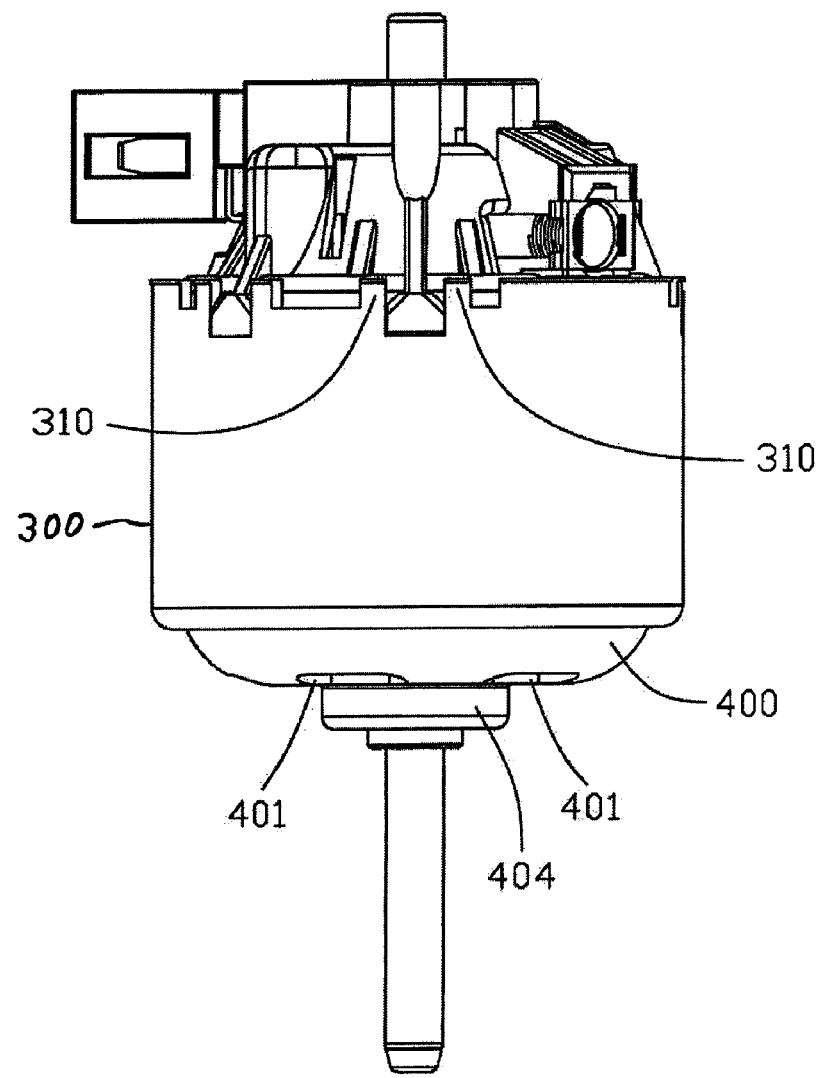
FIG. 8 is a side view of the assembled motor.

FIG. 8 shows the motor. Referring to FIG. 6 to FIG. 8, a bearing holder 404 is formed at the center of the end wall 400. The bearing holder is preferably processed with fine turning.

Figure 9:
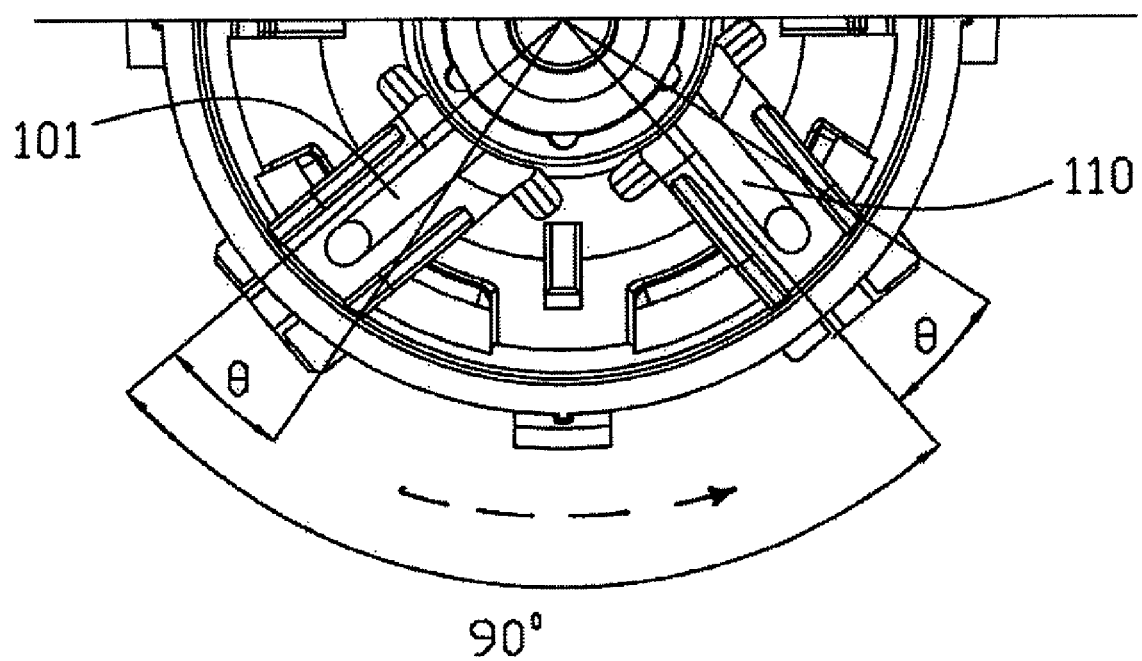
FIG. 9 is plan view of a portion of the end cap.

FIG. 9 shows a part of the end cap. The dashed arrow represents the direction of rotation of the rotor and the commutator which is fixed to rotor shaft and is slidingly contacted by brushes 101 and 110. Each of the brushes is offset by an angle θ from the corresponding radial direction. Particularly, the end of the brush remote from the commutator is offset by an angle θ in a direction opposite the direction of rotation of the commutator. Preferably the angle θ is between 1° to 20°.

With this configuration, the sliding contact between the commutator and the brushes is improved, and mechanical noise is reduced.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A motor for HVAC applications, comprising: a stator; a motor housing forming a part of the stator; an end cap fixed to said motor housing, and a rotor rotatably mounted confronting said stator, wherein said end cap comprises an opening formed by a ring-shaped collar, said collar being at least partly disposed inside said motor housing, a plurality of projections being formed on an outer circumferential surface of said collar, a plurality of receiving cutouts being formed in said motor housing to receive said projections, two fingers being formed at the opening of each receiving cutout and deformed to lock the received projection inside the respective receiving cutout, at least three of said projections being pressed against the axially inner end of said respective receiving cutout; and a plurality of ribs are formed on an outer circumferential surface of said collar, each of said ribs being axially aligned with a corresponding one of said projections and extending axially from said projection towards said opening formed by said collar, the outer diameter of said collar at portions corresponding to said ribs being slightly larger than an inner diameter of said motor housing.

2. The motor of claim 1, wherein the projections being unevenly spaced about the collar.

3. The motor of claim 2, wherein the number of projections is five and only three of said five projections are axially pressed against the axially inner end of the corresponding receiving cutouts.

4. The motor of claim 1, wherein the stator comprises at least one permanent magnet fixed to an inner surface of said motor housing and forming four magnet poles; the rotor comprises a shaft, a rotor core fixed on the shaft and a commutator fixed on the shaft adjacent the rotor core; the commutator comprising an even number of segments for sliding contact with two brushes which are support by the end cap, each of said segments being electrically connected to a diametrically opposite segment by an electric bridge, the angle between said two brushes being between 80° to 100°.

5. The motor of claim 4, wherein the motor comprises an air channel, said air channel having an air inlet formed in the end cap, gaps between the stator and the rotor, and air outlets formed in an end wall of the motor.

6. The motor of claim 5, wherein said air inlet is located between said two brushes and is divided into a first inlet and a second inlet, said first inlet having a larger size than that of said second inlet.

7. The motor of claim 5, wherein the end wall is elliptically convex and a bearing holder is formed at a center portion of the end wall.

8. The motor of claim 4, wherein said end cap further comprises a capacitor, two chokes and two terminals for connecting to a power source, each of said chokes being connected in series with one of said brushes and one of said terminals, said capacitor being connected between said terminals.

9. The motor of claim 8, wherein said terminals are assembled into a motor socket, the motor socket being connected to the end cap by a tongue and groove connection.

10. The motor of claim 4, wherein the rotor core comprises fourteen winding slots, the winding slots being inclined with respect to the rotating axis of the rotor.

11. The motor of claim 4, wherein the motor has a preferred direction of rotation and the radially outer end of each brush is offset from the radial direction in a direction opposite the preferred rotating direction of the motor.

12. A motor for HVAC applications, comprising: a stator; a motor housing forming a part of the stator; an end cap fixed to said motor housing, and a rotor rotatably mounted confronting said stator, wherein said end cap comprises an opening formed by a ring-shaped collar, said collar being at least partly disposed inside said motor housing, a plurality of projections being formed on an outer circumferential surface of said collar, a plurality of receiving cutouts being formed in said motor housing to receive said projections, two fingers being formed at the opening of each receiving cutout and deformed to lock the received projection inside the respective receiving cutout, at least three of said projections being pressed against the axially inner end of said respective receiving cutout, wherein the stator comprises at least one permanent magnet fixed to an inner surface of said motor housing and forming four magnet poles; the rotor comprises a shaft, a rotor core fixed on the shaft and a commutator fixed on the shaft adjacent the rotor core; the commutator comprising an even number of segments for sliding contact with two brushes which are support by the end cap, each of said segments being electrically connected to a diametrically opposite segment by an electric bridge, the angle between said two brushes being between 80° to 100°, and wherein the motor further comprises an air channel, said air channel having an air inlet formed in the end cap, gaps between the stator and the rotor, and air outlets formed in an end wall of the motor, said air inlet being located between said two brushes and is divided into a first inlet and a second inlet, said first inlet having a larger size than that of said second inlet.

13. The motor of claim 12, wherein the rotor core comprises fourteen winding slots, the winding slots being inclined with respect to the rotating axis of the rotor.

14. The motor of claim 12, wherein the motor has a preferred direction of rotation and the radially outer end of each brush is offset from the radial direction in a direction opposite the preferred rotating direction of the motor.

15. The motor of claim 12, wherein the end wall is elliptically convex and a bearing holder is formed at a center portion of the end wall.

16. A motor for HVAC applications, comprising: a stator; a motor housing forming a part of the stator; an end cap fixed to said motor housing, and a rotor rotatably mounted confronting said stator, wherein said end cap comprises an opening formed by a ring-shaped collar, said collar being at least partly disposed inside said motor housing, a plurality of projections being formed on an outer circumferential surface of said collar, a plurality of receiving cutouts being formed in said motor housing to receive said projections, two fingers being formed at the opening of each receiving cutout and deformed to lock the received projection inside the respective receiving cutout, at least three of said projections being pressed against the axially inner end of said respective receiving cutout, wherein the stator comprises at least one permanent magnet fixed to an inner surface of said motor housing and forming four magnet poles; the rotor comprises a shaft, a rotor core fixed on the shaft and a commutator fixed on the shaft adjacent the rotor core; the commutator comprising an even number of segments for sliding contact with two brushes which are supported by the end cap, each of said segments being electrically connected to a diametrically opposite segment by an electric bridge, the angle between said two brushes being between 80° to 100°, and wherein the motor has a preferred direction of rotation and the radially outer end of each brush is offset from the radial direction in a direction opposite the preferred rotating direction of the motor.

17. The motor of claim 16, wherein the rotor core comprises fourteen winding slots, the winding slots being inclined with respect to the rotating axis of the rotor.

18. The motor of claim 16, wherein an end wall of the motor is elliptically convex and a bearing holder is formed at a center portion of the end wall.

\* \* \* \* \*